(12) United States Patent
Damour et al.

(10) Patent No.: US 8,327,530 B2
(45) Date of Patent: Dec. 11, 2012

(54) INSTALLATION FOR CONTINUOUS APPLICATION OF PARTICULATE INSULATION TO AN ELONGATE ELEMENT

(75) Inventors: Jean-Aurélien Damour, Saint-Germain en Laye (FR); Philippe Marchal, Vaucresson (FR); Pierre Ollier, Boulogne-Billancourt (FR); Guillaume Richard, Boulogne-Billancourt (FR)

(73) Assignees: Majus, London (GB); ITP SA, Louveciennes (FR)

( * ) Notice: Subject to any disclaimer, the term of this patent is extended or adjusted under 35 U.S.C. 154(b) by 525 days.

(21) Appl. No.: 12/585,694

(22) Filed: Sep. 22, 2009

(65) Prior Publication Data
US 2010/0095520 A1 Apr. 22, 2010

(30) Foreign Application Priority Data
Oct. 20, 2008 (FR) ...................................... 08 05786

(51) Int. Cl.
*B23P 19/00* (2006.01)
(52) U.S. Cl. ................. 29/745; 29/728; 29/729; 29/759
(58) Field of Classification Search ............... 29/745, 29/592.1, 728, 856, 858, 887, 729, 759; 138/141, 138/149, 151, DIG. 9; 264/119, 165, 257, 264/285, 339
See application file for complete search history.

(56) References Cited

U.S. PATENT DOCUMENTS

| 4,022,248 A | * | 5/1977 | Hepner et al. | ................. 138/141 |
| 4,307,053 A | * | 12/1981 | Daws et al. | ................... 264/165 |
| 4,458,723 A | * | 7/1984 | Nojiri et al. | ................... 138/149 |

FOREIGN PATENT DOCUMENTS

| GB | 1 212 402 | 11/1970 |
| WO | WO 95/15461 | 6/1995 |

* cited by examiner

*Primary Examiner* — Thiem Phan
(74) *Attorney, Agent, or Firm* — Steptoe & Johnson LLP

(57) ABSTRACT

An installation (1) for continuous application of thermally or electrically insulating material (6) around an elongate element (2) having a generally circular cross-section. The installation includes a forcing device (3), in form of a conical tube into which the element (2) is fed simultaneously at the large base end of the conical tube, a sheet (4), on which the insulating material (6) is placed, means for translation of the element through a circular section (2) of the sheet (4), and a device (7) for depositing of insulating material onto the sheet. Such an installation produces thermally insulated tubes or electrically insulated cables.

11 Claims, 4 Drawing Sheets

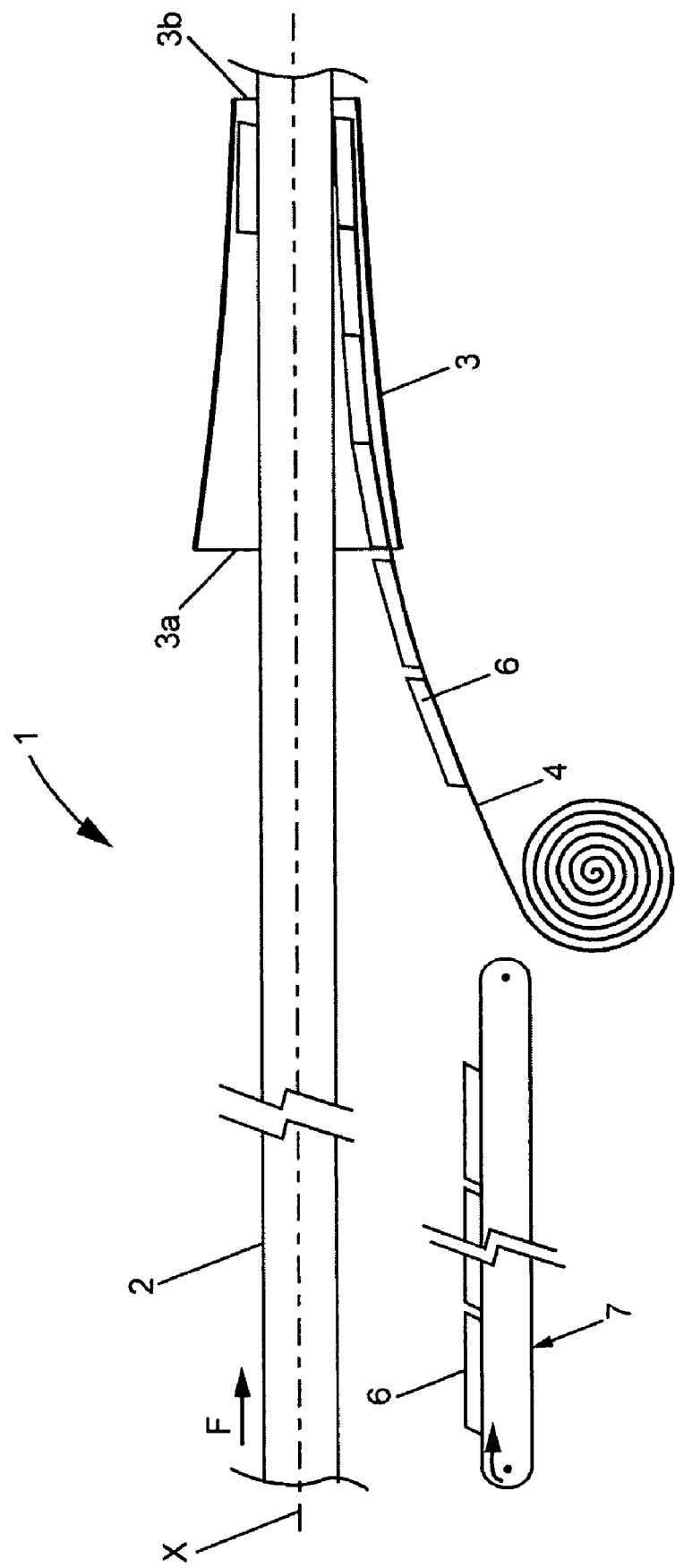

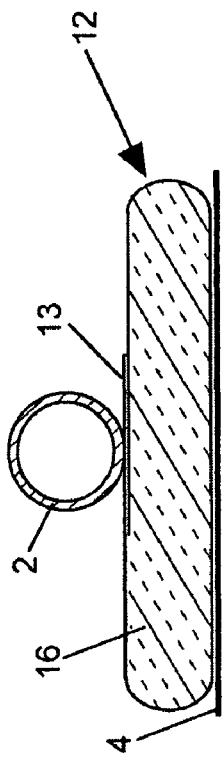
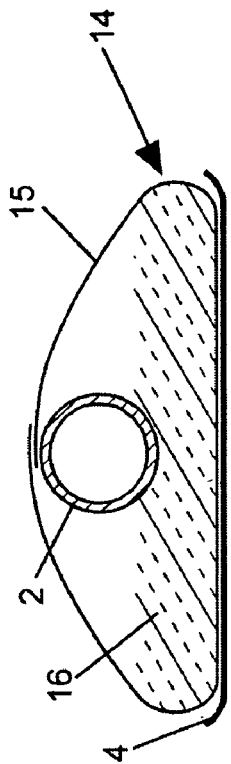
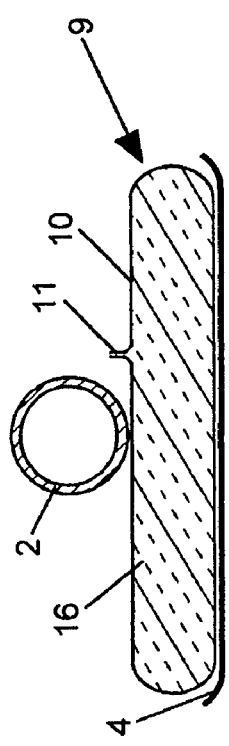
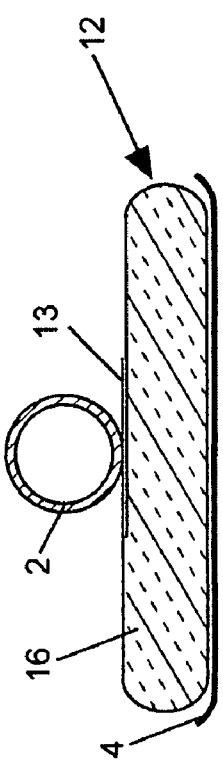
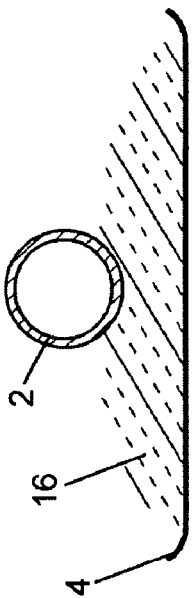

INSTALLATION FOR CONTINUOUS APPLICATION OF PARTICULATE INSULATION TO AN ELONGATE ELEMENT

CROSS REFERENCE TO RELATED APPLICATION

This application claims the benefit of the prior French Patent Application No. 08-05786, filed Oct. 20, 2008, the entirety of which is hereby incorporated by reference into the present application.

BACKGROUND

The present invention is represented by installations permitting the manufacturing of circular cross section elements such as tubes or electrical cables insulated with an insulating material, in particular for installing insulating material around tubes or cylinders.

Generally, thermal insulator material comes either in the form of half-bodies, which are applied against the tube, or which is rolled around the tube in the form of a coating. Regardless of the thermal insulator presentation, its application onto the tube requires considerable manual intervention, which to date has not been particularly automated.

Thermally insulated tubes are used in various industries for transport of hot or cold liquids and to maintain their thermodynamic properties. These tubes are generally wrapped in thermally insulating material to reduce heat exchange with the surrounding media. In the oil industry, thermally insulated double envelope tubes are commonly used for extraction and transport of hydrocarbons. In these industries, the tubes are prefabricated at given lengths, for example approximately 6 to 48 meters, or at continuous lengths from 1 to 10 km. The tubes are generally made of steel, with an external diameter between approximately 1 and 100 cm.

In the case of electric cable elements having circular cross-section, the insulating material is an electric insulator.

SUMMARY OF THE INVENTION

The purpose of the present invention is to provide an automatic or semi-automatic installation for manufacturing of circular section elements, such as tubes or cylinders, insulated thermally or electrically, and to produce them at large lengths to achieve better control of the final product geometry, improve thermal performance in the case of insulated tubes, or electrical performance in the case of cables, reduce manufacturing costs, and eliminate a manufacturing stage, since compacting of powder takes place at the time of its direct application.

Another purpose of the present invention is to achieve compacting of powder around a circular section element, with a ring shape and a controlled density, since such powders are very fine.

Therefore, an object of the invention is an installation for continuous application of thermally or electrically insulating material around a circular section element, characterized by the fact that the installation includes a forcing device in the form of a conical tube, wherein the aforementioned element is engaged simultaneously through the large base of the conical tube, by a sheet on which the insulating material is placed, a device for depositing of the aforementioned insulating material on the sheet, which is in form of a metal or plastic material, and means causing translation of the circular section element and the aforementioned sheet.

The aforementioned forcing device has the length between approximately 1 and 3 meters. Therefore, for a tube approximately 10 cm in diameter, the length of the forcing device is approximately 3 meters. However, its length varies according to the diameter of the tube or wire to be insulated.

According to another invention characteristic, the ratio between the large base diameter and the diameter of the small base of the forcing device is approximately between 1.2 and 4.

According to yet another invention characteristic, the size of the sheet is larger than the circumference of the small base of the forcing device.

According to yet another invention characteristic, the forcing device is in the form of a single piece or is an assembly of conical elements.

According to yet another invention characteristic, the forcing device is extended at its small base by an additional tubular element.

According to yet another invention characteristic, the sheet comes in the form of a coil, unrolled as the circular cross-sectioned element is translated.

According to yet another invention characteristic, the insulating material comes in a raw state in the form of bulk powder or in individual bags.

According to yet another invention characteristic, the translation of the circular sectioned elements is produced by traction or pushing.

According to yet another invention characteristic, the sheet is pulled by the element.

According to yet another invention characteristic, the sheet is made of steel with the thickness smaller than approximately 0.5 mm and is an element of a tube, while the insulator is a thermally insulating material.

Advantageously, the thermally insulated element with circular section includes a sheet applied over the thermally insulating material, covering its free edges.

The invention also includes a process of manufacturing of a circular section element protected with thermally or electrically insulating material, and installation that includes the following stages:
   the element is presented to the forcing device by aligning the axis of the element with the forcing device;
   the sheet is partially introduced to the forcing device;
   the thermally or electrically insulating material is deposited on the sheet; and
   the element and the sheet are translated to achieve simultaneous forcing and compacting of the insulating material and the sheet to surround the inside of the tube.

According to the process characteristic, the thermally or electrically insulating material is placed on the sheet continuously as translation of the element progresses.

According to another process characteristic, covering of the element by thermally or electrically insulating material and covering the insulating material by the sheet are performed by compression in the forcing device.

According to another process characteristic, the insulating material in the form of powder is deposited from bulk powder or bags thereof.

According to another process characteristic, the internal surface of the forcing device can be advantageously covered with a thickness of material facilitating gliding of the sheet on the walls of the forcing device and limiting the force required.

The insulating material may be deposited from an open bag.

The invention involves also a thermally insulated tube, obtained according the inventive process.

Advantageously, the thermally insulated tube includes a sheet applied on the thermally insulating material and covering its free edges.

The invention also involves double envelope tubing that includes a thermally insulated tube.

The invention also involves an electrically insulated cable obtained according to the inventive process.

The invention also involves application of the inventive installation to manufacturing of thermally insulated tubes with large lengths, for example from a few meters to many kilometers.

A first advantage of the inventive installation is reduction of manufacturing costs thanks to reduction of manual intervention.

Another advantage is the resulting homogeneousness insulating material applied around the elements by uniform compression and direct application on the element.

Another advantage in case of tubes is that non-uniformities are compensated for, which results in a thermally insulated tube with better dimensional tolerances than those obtained with prior methods. The thickness of the thermally insulating element is optimized and overall global and local insulation achieved are better than those obtained with prior methods.

Another advantage is that the installation can be used quickly, at any location, and does not require qualified operators.

Another advantage is high productivity of the inventive installation and process, permitting rates of production of thermally insulated elements higher than 1 meter per minute.

BRIEF DESCRIPTION OF THE DRAWINGS

Other characteristics, details and advantages of the invention are detailed in the following description, together with the drawings, wherein:

FIG. 1 shows a schematic, partial cross-sectional view of the installation according to the invention.

FIGS. 3a to 3e show various inventive layouts of the insulating material with respect to the sheet.

DETAILED DESCRIPTION

Figure 2A:
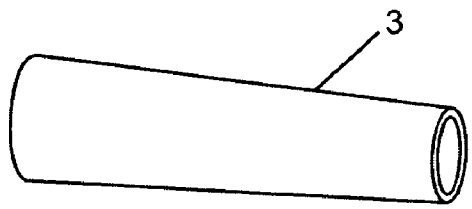
FIGS. 2a to 2d show various configurations of the inventive forcing device.

As indicated above, the invention is meant to assure better thermal insulation performance for a given external diameter of the final object, considerable reduction of costs of installation of the insulating material, taking into account the tolerances to optimize implementation and reduce the overall costs of the system.

The following part of the description is devoted in particular to a tube to be thermally insulated, as well as any circular section element that can be insulated by the installation, such as a cable to be electrically insulated or any other element, without limiting the scope of the invention. In the following description, we discuss in particular a thermal insulator, with the understanding that in case of a cable, the insulator is an electric insulator, but does not modify the installation described below.

FIG. 1 is a schematic partially cross-sectional representation of installation 1 according to the invention, wherein a thermally insulating material is wrapped around tube 2.

Tube 2 is of any length, such as in sections of 6 to 24 m, that are progressively welded to one another to achieve lengths of 1 to 10 km, or sections of several hundred meters or even simple sections with no intention of welding them together. These lengths are given as an example. Tube 2 can also be very long and coiled onto a large diameter wheel, which is extended and straightened during implementation to be substantially linear. Tube 2 is generally made of steel, and is almost always a cylindrical tube. This tube is positioned on a base, not represented here, but which a person skilled in the art may understand without difficulty, and its axis is essentially aligned with a direction X. This tube 2 is driven continuously in translation following arrow F to a forcing device 3 through which it is forced to move. In the figure, device 3 is in the form of a conical tube, tube 2 entering the large base 3a of device 3. The axis of device 3 is also aligned with the X direction to be disposed coaxial with tube 2.

The ratio of the diameter of the large base 3a with respect to the diameter of the small base 3b of the forcing device is between about 1.2 and 4. This range of values permits simultaneous driving of sheet 4 carrying the insulating material with the translation of tube 2. Of course, this range is exemplary, not exclusive.

A sheet 4 is positioned near device 3 and is in the form of a coil 5. This coil is positioned to be unwound progressively with the movement of sheet 4. Sheet 4 here is a steel sheet with a thickness of less than about 0.5 mm. However, sheet 4 may be of any material, e.g., metal or plastic, as long as its resistance to tearing is sufficient to withstand the stresses imposed by the forcing cone.

Bags of thermal insulating material 6 are supplied by a depositing device 7, such as an endless belt, so that insulating material is placed progressively on sheet 4 as it is unwound. In the figure, the bags are sealed. The bags should be of sufficient flexibility to permit them to be wrapped around tube 2. However, the insulating material may be in the form of open bags filled in situ with the insulating material, for example on belt 7.

The thermal insulating material is a known material and may be of different kinds. One can typically use a granular material of the micro or nano-porous type such as aerogels, or a precipitated or pyrogenated silica powder in a proportion of 50 to 100%, with a titanium dioxide type opacifier in a proportion of 0 to 15%, and fibers such as glass fiber in a proportion of 0 to 15%, to give the material homogeneity. The insulating material may be compacted, or at least pre-compacted, to a predetermined density to facilitate handling. Or, the insulating material may not be compacted. Such insulative powders have a majority of particles with a size of less than one micron.

The width of sheet 4 may be larger than the circumference of the small base 3b of the forcing device. This permits formation of a joint by mutual overlapping of the two edges of the sheet instead of an edge-to-edge butt joint that is difficult to implement.

Figure 2B:
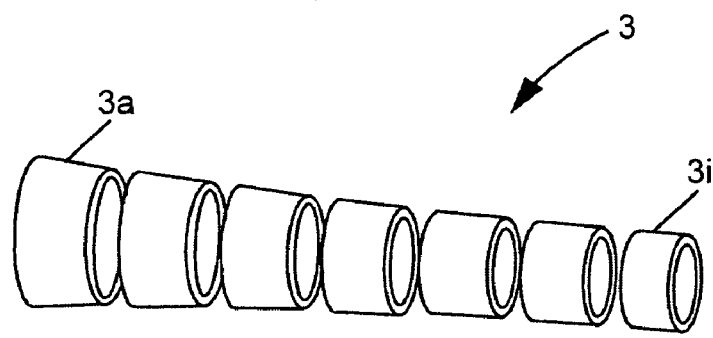

The forcing device 3 may be in the form of a single component or an assembly of conic elements. In FIGS. 2a through 2d, various configurations are shown for forcing device 3. In FIG. 2a, the forcing device 3 is made in one piece, such as of steel, with an inner surface that facilitates the progression of tube 2. In FIG. 2b, device 3 comprises several conic sections 3i. Such an embodiment facilitates transport through the forcing device 3, especially when a significant length is required, for example 3 meters.

Figure 2C:
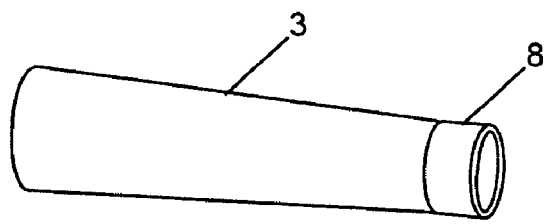
Figure 2D:
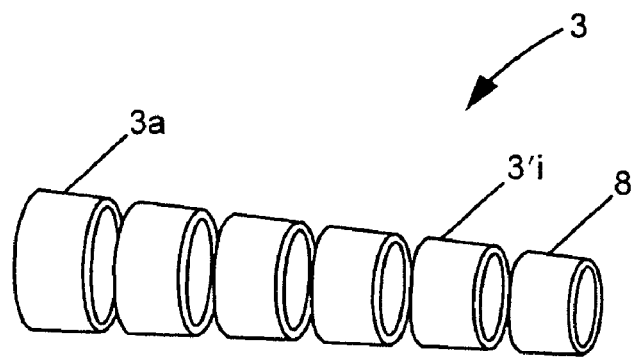

Connecting means are provided between two consecutive sections to ensure continuity of the surface of the assembled device. In FIG. 2c, the conical device 3 is one piece as shown in FIG. 2a, but is extended from its small base by a further tubular element 8. The internal diameter of element 8 is equal to that of the small base. The role of this element 8 is to finish the final cylindrical shape of the insulated tube 2 during its passage. This latter element may also have a longitudinal slot or window permitting the use of a tool, such as a laser, to close envelope 4 by welding it together. In FIG. 2d, the forcing device 3 comprises several conic sections 3i, extended by the tubular element 8.

The dimensions of the forcing device may be adapted by a person skilled in the art in accordance with the external diameter of the tube to be insulated and the final diameter of the desired insulated tube.

As noted previously, the insulating material may be provided in powder form either in bags or in bulk.

FIG. 3a shows a bag 9 of insulating material deposited on sheet 4, and where envelope 10 is sealed by seam 11. The edges of sheet 4 are distorted to facilitate folding during passage through the forcing device 3.

FIG. 3b shows a bag 12 initially opened, then filled in situ with insulating material, and then sealed by folding over the two edges of envelope 13 when passing through the forcing device 3. The free edges of envelope 13 are arranged to overlap one another over a substantial portion of their surfaces. In this configuration, sheet 4 is completely flat. This embodiment permits elimination the compression step.

FIG. 3c shows the same arrangement as in FIG. 3b, but the edges of sheet 4 are folded over.

FIG. 3d shows the insulating material in the form of an open bag 14 which has been filled with insulating material, but where the free edges of envelope 15 are folded over on tube 2. When wrapping around tube 2, the free edges of envelope 15 slide over one another to form a bag that permits expansion of the insulating material.

Finally, FIG. 3e shows a heap of insulating material 16 deposited directly onto sheet 4, the edges of which are slightly folded over. This embodiment avoids use of bags of insulating material by directly using bulk material.

Figure 4:
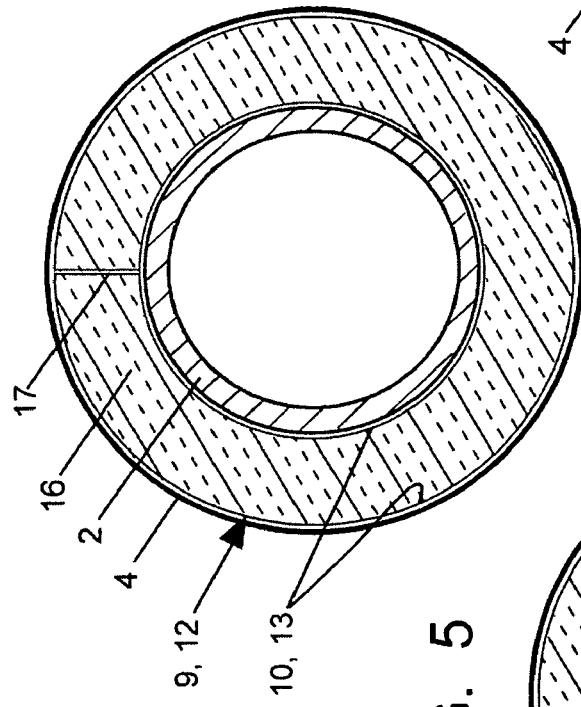

FIG. 4 shows a section view of the insulated tube at the exit of the forcing device 3 now including the insulating material of FIGS. 3a, 3b and 3c. Tube 2 itself, from the inside to the outside, includes the layer of insulating material 9 or 12, envelope 10 or 13, or a double thickness of the bag and sheet 4. Joint 17 is in this figure where the two edges of the bag come into close contact with one another.

Figure 5:
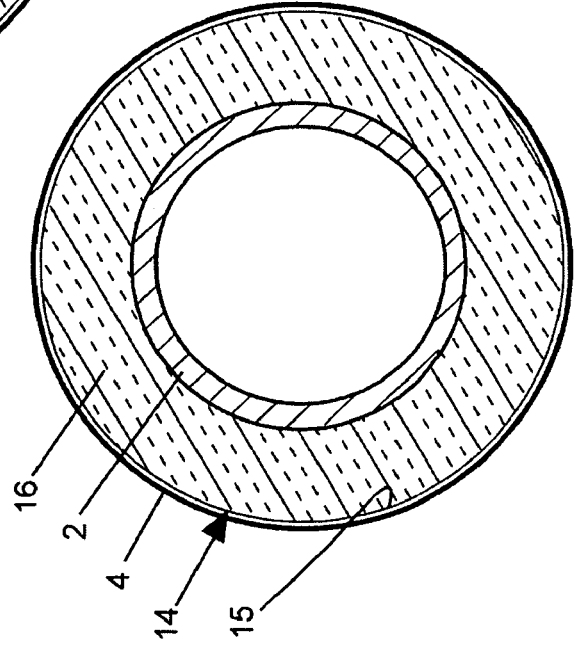

FIG. 5 shows the insulated tube 2 at the exit of the forcing device 3 from the insulating material of FIG. 3d. There is no longer a joint between the free edges of envelope 15 of bag 14 as shown in FIG. 4.

Figure 6:
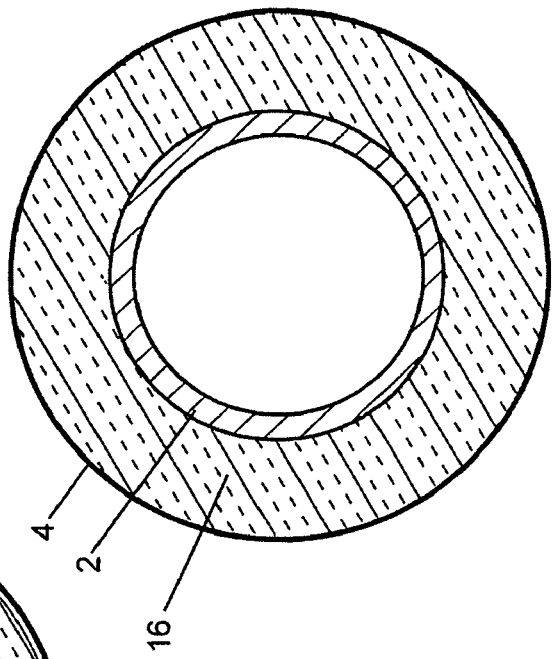
FIGS. 4 to 6 show cross-sections of various inventive configurations of a thermally insulated tube.

FIG. 6 shows the insulated tube 2 at the exit of the forcing device 3 now including the insulating material of FIG. 3e. Note the absence of bags in this figure. The thermal insulating material 16 has continuity of structure and is enclosed in the coiled sheet 4.

As indicated above, tube 2 is driven continuously. This may be performed in various ways, such as by pushing or pulling the tube. By initially engaging sheet 4 in forcing device 3, the sheet is driven by the tube to which it is being attached.

The invention also concerns a method for producing a tube protected by a thermal insulating material as follows:
present tube 2 to forcing device 3 by aligning the axis of the tube with that of the forcing device in a single direction Z;
partially introduce sheet 4 in forcing device 3 at the end of the tube while folding the edges of the sheet back slightly. This helps decrease the interaction between tube 2 and sheet 4;
deposit the insulating material 6 on sheet 4, as close to its end as possible; and
drive tube 2 forward and thus sheet 4, to achieve simultaneously the forcing and forming of the insulating material and the sheet around the tube.

In this way, by supplying sheet 4 with insulating material, one obtains an insulated tube of the desired length, for example, from a few meters up to 10 km. The elements of the tube are welded together in situ upstream of the installation according to the invention, or the tube is unwound from a large diameter wheel. If necessary, one can connect sheet 4 to a traction means, which may be that of tube 2.

The method according to the invention permits the continuous depositing of thermal insulating material in the form of powder from bulk or bags, onto the sheet progressively with the translation of tube 2. The use of bulk powder allows the thermal insulating material to be produced in situ from various components such as micro-porous material, fibrous material, opacifiers, and the like, described previously. When the thermal insulating material is in bags, they can be filled on site from bulk powder. One can then apply the free edges of the bags directly to tube 2 and thus bring the insulating material into direct contact with tube 2, as when the insulation is used in bulk.

The method according to the invention also permits covering tube 2 with thermal insulating material and covering of the insulating material by sheet 4 through compression in forcing device 3. And, this can be performed in one step.

The method according to the invention provides the use of forcing device 3 to ensure close connection between the thermal insulating material and the tube, and consequently enables proper distribution of the insulating material around tube 2.

The invention also includes the thermally insulated tube obtained by the method. In fact, tube 2 also comprises a single continuous sheet 4 applied to the thermal insulating material with the free edges of the sheet covering each other. This continuously-produced insulated tube can be very long, for example from 1 to 10 km.

The invention also includes a jacketed double tube with an insulated tube having thermal insulating material applied to the tube by a continuous sheet. This jacketed double tube can be produced by introducing the insulated tube coming from the exit of the forcing device into an outer tube using a known technique. One can thus produce very long jacketed double tubes without any welded seams in the jacketed double tubes. Very long means lengths on the order of 1 to 10 km, for example. A jacketed double tube to be inserted into an oil or gas well or a larger diameter tube to be laid under the sea, can easily be produced at a factory on land and then rolled up, transported, and unwound at its place of use.

The installation according to the present invention also provides, without significant modification, production of an electrically insulated cable. One simply replaces the thermal insulation 6 with electrical insulation, such as magnesia, and the use of a sheet of synthetic non-conducting material such as a plastic sheet. The electrical cable may include a single wire or several wires, twisted or not.

Those skilled in this art will appreciate that the invention may include other elements and steps reasonably within the lawful scope of the following claims.

The invention claimed is:

1. An installation for the continuous application of thermal or electrical insulation in granular particle form to an elongate element having a circular cross-section, comprising:
a forcing device in the form of a conical tube for engaging in its large base, simultaneously, both such an element, and a sheet on which the granular particles of insulating material are deposited, which sheet is of sufficient width to envelop the outer circumference of the insulation material surrounding the elongate element, means for driving in translation said element and said sheet, and a depositing device for depositing the granular particulate insulating material on said sheet.

2. The installation of claim 1, wherein said sheet is a metal or plastic material.

3. The installation according to claim 1, wherein the forcing device has a length between about 1 and 3 meters.

4. The installation of claim 3, wherein the ratio of the diameter of the large base to the diameter of the small base of the forcing device is between about 1.2 and about 4.

5. The installation of claim 4, wherein the sheet is metal of width larger than the circumference of the small base of the forcing device.

6. The installation of claim 1, wherein the forcing device is a conical part in the form of either a single part or a plurality of elements that form a conical part.

7. The installation of claim 1, wherein the forcing device is extended at its small base end by a further tubular element.

8. The installation of claim 1, wherein the sheet is in the form of a roll for unwinding progressively with the translation of the circular cross-sectioned element.

9. The installation of claim 1, wherein the insulating material is in the form of a powder.

10. The installation of claim 9, wherein more than 50% of the granular particles of the insulating material powder are less than one micron in size.

11. The installation of claim 1, wherein the sheet is a steel sheet with a thickness of less than about 0.5 mm, the element is a tube, and the insulating material is thermal insulating material.

* * * * *